United States Patent [19]
Parker et al.

[11] 3,885,575
[45] May 27, 1975

[54] MANUFACTURE OF A SMOKING MATERIAL

[75] Inventors: James Brown Parker; John Evan Philip Hicks, both of Manchester, England

[73] Assignee: Imperial Chemical Industries Limited, London, England

[22] Filed: Aug. 7, 1973

[21] Appl. No.: 386,427

[30] Foreign Application Priority Data
Aug. 31, 1972 United Kingdom............... 40322/72

[52] U.S. Cl.................. 131/2; 131/140 C; 260/209; 131/121
[51] Int. Cl............................................. A24b 15/00
[58] Field of Search........... 260/209 R; 131/17, 121, 131/2, 140-144

[56] References Cited
UNITED STATES PATENTS

| | | | |
|---|---|---|---|
| 2,907,686 | 10/1959 | Siegel | 131/2 |
| 3,425,425 | 2/1969 | Hind et al. | 131/140 P |
| 3,545,448 | 12/1970 | Mormon et al. | 131/2 |

*Primary Examiner*—Melvin D. Rein
*Attorney, Agent, or Firm*—Cushman, Darby & Cushman

[57] ABSTRACT

A method for manufacture of a smoking material is disclosed which involves impregnating a non-toxic carbohydrate base material with 2.5–10% by weight of a degradation catalyst in aqueous solution, partially drying the base to a water content of 1–15% and then catalytically degrading the carbohydrate by microwave heat so that the weight of the degraded material is less that 90% of the original carbohydrate. The microwave energy employed in the degradation process is supplied at a rate of 100–300 calories for each gram of carbohydrate.

8 Claims, No Drawings

MANUFACTURE OF A SMOKING MATERIAL

This invention relates to a process for manufacture of a modified carbohydrate material suitable as a smoke producing constituent of smoking mixtures for cigarettes, cigars, pipes and the like.

Our United Kingdom Pat. No. 1,113,979 describes and claims the manufacture of a modified carbohydrate by subjecting carbohydrate to a catalysed thermal degradation process at a temperature of 100°–250°C until the weight of the degraded material is less than 90% of the weight of the original carbohydrate.

According to the present invention a continuous process for the manufacture of a modified carbohydrate suitable for smoking mixtures comprises passing carbohydrate material admixed with from 2.5 to 10% by weight of a degradation catalyst and from 0 to 15% (particularly 1% to 8%) by weight of water through a zone into which microwave energy is supplied to the carbohydrate material at the rate of 100 to 300 (particularly 120 to 200) calories for each gram of carbohydrate material entering the zone.

A convenient form of apparatus for carrying out the process of the invention comprises a microwave generator, for example a magnetron or klystron, situated at one end of a cavity consisting of a duct which follows a convoluted or serpentine path and if desired has an earth or water load at its other end. Alternatively a reflecting plate can be used at its other end so that unabsorbed microwave energy is redirected into the zone. The duct is split laterally into two halves which close so as to leave lateral slits through which passes a conveyor belt or other means to carry the carbohydrate through the microwave zone. Apparatus of this general type is already known and is described and illustrated for example in "Electrical Times, 29th Aug., 1968, FOCUS".

Microwaves having the ISM allocated frequencies of 915, 2,450, 5,800 or 22,125 MHz can be used in the practice of the invention.

Preferably, the carbohydrate material used as starting material in the process of the invention is cellulose, conveniently in sheet form in which case it may pass downwardly into the microwave zone from a supply roll and the use of conveyer means can be minimised. If desired, however, the carbohydrate material may be in chips, powder or granule form. Besides cellulose itself, other examples of carbohydrate materials which may be used are cellulose derivatives such as methyl cellulose, starch, e.g., rice, potato and maize starch, alginates, pectin, natural gums such as gum tragacanth, gum arabic and locust bean gum, and simpler carbohydrates including mono- and di-saccharides for example glucose and sucrose.

The catalyst used in the process of the invention is preferably ammonium sulphamate. In general the catalyst is acidic or basic and besides ammonium sulphamate the following are effective under the specified conditions:- sulphamic acid, phosphoric acid, diammonium hydrogen phosphate, ammonium dihydrogen phosphate, sulphuric acid, ammonium sulphate, hydrochloric acid, ferric chloride.

Conveniently, but not essentially, the carbohydrate may be impregnated with the catalyst as an aqueous solution applied for example by spraying or by means of a roller. The impregnated carbohydrate may then be dried, but desirably up to 15% (preferably 1% to 8%) of water should still be present in the carbohydrate entering the microwave zone since this increases the microwave energy absorption coefficient of the sheet.

A further feature of the invention comprises sweeping a non-reactive gas through the microwave zone at a rate sufficient to sweep out volatile degradation products. By non-reactive gas is meant any gas which is unreactive towards the carbohydrate/catalyst mixture or its degradation products under the conditions appertaining in the microwave zone. Air may conveniently be used since the conditions do not effect any oxidation as a result of contact with atmospheric oxygen.

If desired the non-reactive gas used in this feature of the invention may be heated for example above 100°C and preferably in the range 150° to 200°C, in order at least to counteract heat losses which would otherwise occur, and to minimise condensation of volatile products on the walls of the zone.

It is also desirable, for similar reasons, to heat the walls of the zone for example by electrical means.

The product of the process is suitable for use in smoking mixtures as described in U.K. Specifications Numbers 1,113,979 and 1,299,296. The smoke from cigarettes filled with these mixtures contains relatively small proportions of tar and other ingredients which are generally considered harmful, and is milder and less irritant to the eyes and throat than tobacco smoke.

The invention is illustrated but not limited by the following Example in which the parts are by weight:

EXAMPLE

α-Cellulose sheet 1.5 mm thick and 60 cm wide, with a unit weight of 700 g/m² was impregnated uniformly with ammonium sulphamate solution so that it contained 5% of its weight of ammonium sulphamate, and partially dried. The sheet was then arranged for passage through a series of ducts into which microwave energy of frequency 915 MHz could be supplied at controlled rates. A water load was arranged at the end of the ducts to absorb the excess energy and allow this to be measured. In various experiments the cellulose sheet was passed through the ducts at controlled speeds, with controlled generator outputs while hot air (170°C inlet and outlet temperature) was passed through to remove volatile degradation products. The percentage weight loss achieved under varying conditions is indicated in Tables I to III.

TABLE I

| Sheet speed Moisture Content | | | 1.5 metres/minute 2–3% | |
|---|---|---|---|---|
| Generator Output (KW) | Excess KW | Power Used KW | Energy supplied to sheet calories/g. | Weight Loss % |
| 11 | 5 | 6 | 133 | 10 |
| 12½ | 7 | 5½ | 122 | 18 |
| 14 | 8 | 6 | 133 | 24 |
| 16½ | 10 | 6½ | 145 | 28 |
| 19 | 12 | 7 | 155 | 29½ |

TABLE II

| Sheet Speed | | | 2.25 metres/minute | |
| Moisture Content | | | 3-6% | |

| Generator Output (KW) | Excess KW | Power Used KW | Energy supplied to sheet calories/g. | Weight Loss % |
| --- | --- | --- | --- | --- |
| 12.5 | 6 | 6.5 | 99 | 4 |
| 16.5 | 8 | 8.5 | 130 | 13 |
| 19 | 9 | 10 | 150 | 20 |
| 23.5 | 13 | 10.5 | 160 | 27 |

TABLE III

| Sheet speed | | | 3.0 metres/minute | |
| Moisture Content | | | 2-3% | |

| Generator Output (KW) | Excess KW | Power Used KW | Energy supplied to sheet calories/g. | Weight Loss % |
| --- | --- | --- | --- | --- |
| 14 | 7 | 7 | 77 | 2 |
| 21 | 9½ | 11½ | 125 | 13 |
| 23½ | 11 | 12½ | 138 | 19 |
| 26 | 13 | 13 | 143 | 26 |

Table IV summarises some further experiments carried out on similar lines.

From the above tables it can be seen that satisfactory weight loss occurs when the microwave energy supplied to the carbohydrate exceeds about 100 calories per gram. Products made in similar way from the above starting material, with energy supplied at rates between 100 and 300 calories/g. were acceptable materials for use in smoking mixtures as described in the Examples of U.K. Patent Specification Number 1,113,979. The smoke from these materials in cigarettes contained relatively small proportions of tar and other ingredients which are generally considered harmful, and was milder and less irritant to the eyes and throat than tobacco smoke.

In similar experiments acceptable smoking materials were obtained, using from 2.5 to 10% by weight of ammonium sulphamate as catalyst.

Acceptable smoking materials may similarly be obtained by using as catalyst sulphamic acid, phosphoric acid, diammonium hydrogen phosphate, ammonium dihydrogen phosphate, ammonium sulphate, hydrochloric acid, or ferric chloride.

In place of the cellulose used in the above experiments other carbohydrates can be used, particularly starch, methyl cellulose, glucose, or sucrose, alginates, pectin, gum tragacanth, gum arabic or locust bean gum.

TABLE IV

| Power Used KW | Sheet feed metres/min. | Energy supplied to sheet calories/g. | Weight Loss % | | | |
| --- | --- | --- | --- | --- | --- | --- |
| 26 | 3.9 | 220 | 29 | 15% water, | 5% sulphuric acid | |
| 8 | 2.1 | 125 | 28 | 4% water, | 5% sulphuric acid | |
| 14 | 3.0 | 154 | 26 | 4% water, | 5% ammonium sulphamate | |
| 12 | 2.25 | 175 | 28 | do. | do. | |
| 6 | 1.5 | 126 | 27 | 2½-4% water, | 5% ammonium sulphamate | |
| 10.4 | 2.25 | 145 | 27 | do. | do. | |
| 13.6 | 3.0 | 143 | 27 | do. | do. | |
| 5.5 | 1.5 | 114 | 25 | do. | do. | |
| 12 | 2.25 | 167 | 28 | do. | do. | |
| 14 | 3.0 | 148 | 26 | do. | do. | |
| 14 | 2.3 | 190 | 27 | 1½-6% water, | 5% ammonium sulphamate | |
| 18 | 2.7 | 212 | 29 | water load used | | |
| 17 | 3.0 | 180 | 28 | reflector plate fitted | | |
| 23 | 2.25 | 217 | 27 | | | |
| 11.2 | 1.15 | 210 | 27 | | | |
| 21.8 | 2.25 | 207 | 27 | | | |
| 14.8 | 2.25 | 207 | 25 | 2-5% water, | 5% ammonium sulphamate. | Thick sheet |
| 15.4 | 3.0 | 180 | 25 | do. | do. | do. |
| 17.7 | 2.1 | 296 | 26 | 10% water, | do. | do. |
| 14.8 | 2.1 | 248 | 25 | 2-5% water, | do. | do. |
| 14.5 | 2.25 | 193 | 27 | do. | do. | do |
| 5.8 | 1.5 | 127 | 25 | 2½% water, | 5% ammonium sulphamate | |
| 10.2 | 2.25 | 150 | 25 | do. | do. | |
| 13.1 | 3.0 | 144 | 25 | do. | do. | |

We claim:

1. In a process for the manufacture of a modified non-toxic carbohydrate material suitable for smoking mixtures which comprises the catalytic degradation of a carbohydrate material by impregnating said material with from 2.5 to 10% by weight of a degradation catalyst in aqueous solution followed by drying and heating until the weight of the degraded material is less than 90% of the weight of the original carbohydrate material, the improvement which comprises only partially drying the impregnated material so that the partially dried material contains from 1 to 15% by weight of water, and catalytically degrading said partially dried carbohydrate material by exposing the same to microwave energy at the rate of 100 to 300 calories for each gram of carbohydrate material until the desired degree of degradation is attained.

2. Process according to claim 1 wherein the carbohydrate material is partially dried to contain from 1 to 8% by weight of water.

3. Process according to claim 1 wherein microwave energy is supplied to the carbohydrate material at the rate of 120 to 200 calories for each gram of carbohydrate material entering the zone.

4. Process according to claim 1 wherein the carbohydrate material is cellulose.

5. Process according to claim 1 wherein the degradation catalyst is ammonium sulphamate.

6. Process according to claim 1 wherein a non-reactive gas is swept through the microwave zone at a rate sufficient to sweep out volatile degradation products.

7. Process according to claim 6 wherein the non-reactive gas is heated above 100°C.

8. Process according to claim 6 wherein the non-reactive gas is heated in the range 150° to 200°C.

* * * * *